US010995709B2

(12) United States Patent
Hashimoto et al.

(10) Patent No.: US 10,995,709 B2
(45) Date of Patent: May 4, 2021

(54) ENGINE PERIPHERAL STRUCTURE

(71) Applicant: HONDA MOTOR CO., LTD., Tokyo (JP)

(72) Inventors: Katsushi Hashimoto, Wako (JP); Katsuaki Shibuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/624,506

(22) PCT Filed: Jul. 5, 2017

(86) PCT No.: PCT/JP2017/024713
§ 371 (c)(1),
(2) Date: Dec. 19, 2019

(87) PCT Pub. No.: WO2019/008710
PCT Pub. Date: Jan. 10, 2019

(65) Prior Publication Data
US 2020/0232427 A1  Jul. 23, 2020

(51) Int. Cl.
*F02M 35/10* (2006.01)
*F02B 37/16* (2006.01)

(52) U.S. Cl.
CPC ....... *F02M 35/10157* (2013.01); *F02B 37/16* (2013.01); *F02M 35/10091* (2013.01); *F02M 35/10268* (2013.01)

(58) Field of Classification Search
CPC ....... F02M 35/10157; F02M 35/10091; F02M 35/10268; F02M 35/10; F02B 37/16
See application file for complete search history.

(56) References Cited

U.S. PATENT DOCUMENTS

| 2007/0199321 A1 | 8/2007 | Miura et al. |
| 2017/0082040 A1 | 3/2017 | Hirose et al. |
| 2017/0218892 A1* | 8/2017 | Zhao .............. F02B 33/40 |

FOREIGN PATENT DOCUMENTS

| CN | 106414960 A | 2/2017 |
| JP | H04-066725 | 3/1992 |

(Continued)

OTHER PUBLICATIONS

Japanese Office Action dated May 26, 2020, English translation included, 10 pages.

(Continued)

*Primary Examiner* — Audrey K Bradley
*Assistant Examiner* — Edward Bushard
(74) *Attorney, Agent, or Firm* — Rankin, Hill & Clark LLP

(57) ABSTRACT

An engine peripheral structure includes an engine body mounted in an engine room, an intake system connected to the engine body, and a supercharger provided in the middle of the intake system. The intake system includes a low-pressure intake passage connected upstream in an intake direction of the supercharger, and a high-pressure intake passage connected downstream in the intake direction of the supercharger. The intake system has the high-pressure intake passage turned back at the supercharger with respect to the low-pressure intake passage, and has the low-pressure intake passage and the high-pressure intake passage extended on a left side surface of the engine body so as to be at least partly overlapped with each other in the up-down direction V.

8 Claims, 12 Drawing Sheets

(56) References Cited

FOREIGN PATENT DOCUMENTS

| JP | 2007-224864 A | | 9/2007 |
|---|---|---|---|
| JP | 2007224864 A | * | 9/2007 |
| JP | 2009-299506 A | | 12/2009 |
| JP | 2015-129452 A | | 7/2015 |

OTHER PUBLICATIONS

International Search Report by ISA/JP dated Sep. 12, 2017, on PCT/JP2017/024713 (3 pages).
Written Opinion by ISA/JP dated Sep. 12, 2017, on PCT/JP2017/024713 (4 pages).
Office Action received in corresponding CN application No. 201780092756.5 dated Feb. 19, 2021 with English ranslation (19 pages).

* cited by examiner

US 10,995,709 B2

ENGINE PERIPHERAL STRUCTURE

TECHNICAL FIELD

The present invention relates to an engine peripheral structure.

BACKGROUND OF THE INVENTION

A structure having intake system piping routed around an engine body is known as a conventional engine peripheral structure (see Patent Document 1, for example).

PRIOR ART DOCUMENTS

Patent Documents

Patent Document 1: Japanese Patent Application Publication No. 2015-129452

SUMMARY OF THE INVENTION

Problem to be Solved

A conventional engine peripheral structure requires complicated piping due to engine accessories such as a supercharger and an intercooler. For this reason, it is difficult in a vehicle model having a small engine room to implement a layout to include intake system piping and engine accessories, and therefore further improvement has been demanded. The present invention is intended to provide an engine peripheral structure to allow for making intake system piping compact.

Solution to Problem

The present invention provides an engine peripheral structure including an engine body mounted in an engine room, an intake system connected to the engine body, and a supercharger provided in the middle of the intake system, wherein the intake system includes a low-pressure intake passage connected upstream in an intake direction of the supercharger and a high-pressure intake passage connected downstream in the intake direction of the supercharger, and the intake system has the low-pressure intake passage and the high-pressure intake passage extended on one side surface of the engine body in a top view of the engine room so as to be at least partly overlapped with each other in a top view of the engine room.

Advantageous Effects of the Invention

According to this invention, an engine periphery structure is provided that allows for making intake system piping compact.

EMBODIMENTS OF THE INVENTION

Figure 1:
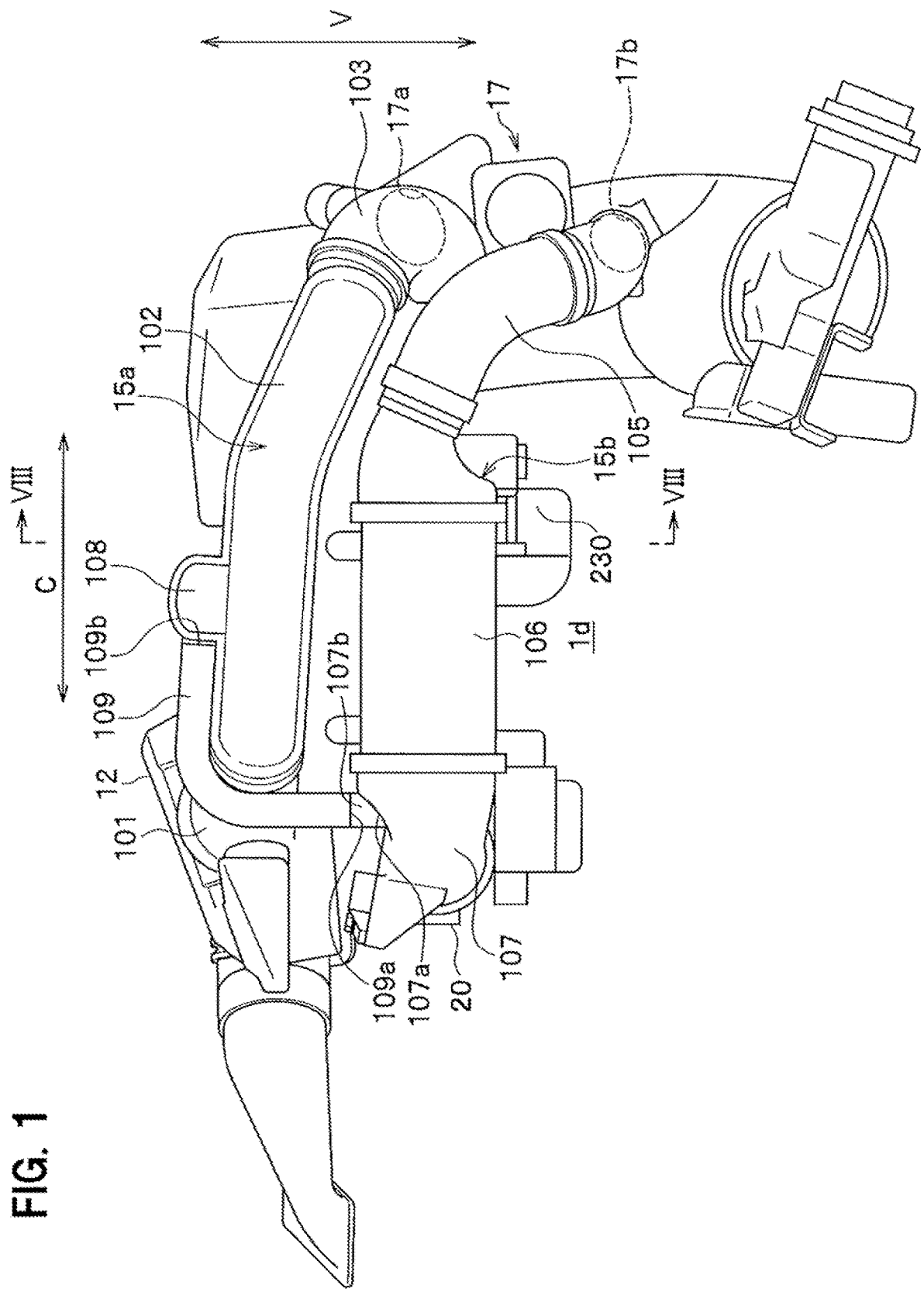
FIG. 1 is a side view of an engine peripheral structure according to an embodiment of the present invention to illustrate a configuration, as viewed from a direction I in FIG. 2, of an upper part of an engine body mounted in an engine room.

Hereinafter, an embodiment of the present invention will be described with reference to the drawings as required. The same components are denoted by the same reference numerals, and duplicate descriptions are avoided. When a direction is described, the description is basically based on the front, rear, right, left, up or down as viewed from a driver, unless otherwise indicated. In addition, the "vehicle width direction" is synonymous with the "right-left direction." In the embodiment, an up-down direction V is a direction substantially parallel to a cylinder axis direction.

Figure 2:
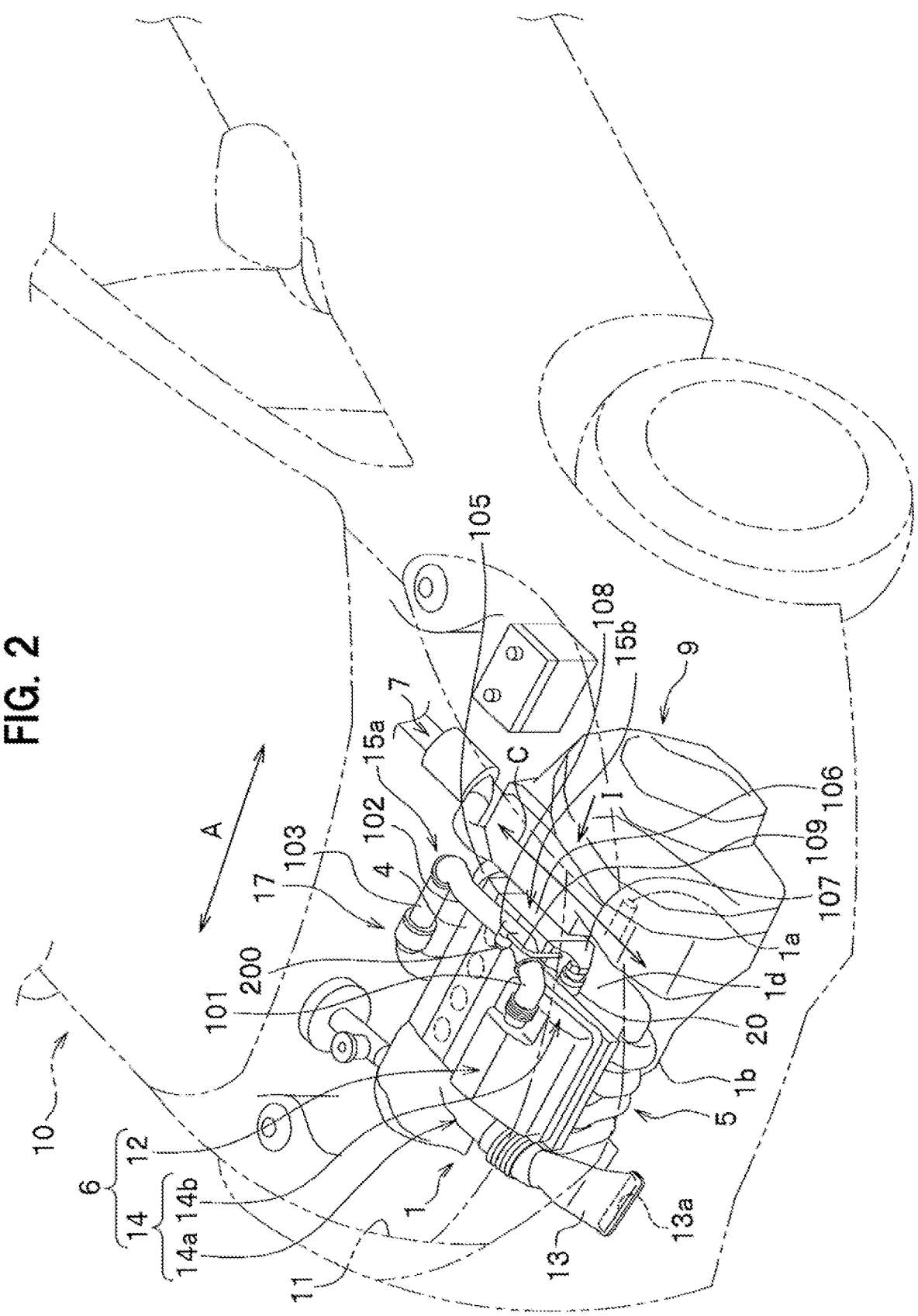
FIG. 2 is a perspective view of the engine peripheral structure, as the inside of the engine room of a vehicle transparently viewed from diagonally in front of the vehicle.

As shown in FIGS. 1 to 4, an engine body 1 is mounted in an engine room 11 in the present embodiment, which is formed in the front portion of a vehicle 10 (see FIG. 2). The engine body 1 mainly includes a cylinder block 2, a cylinder head 3, and a cylinder head cover 4 (see FIG. 3).

The cylinder block 2 of the engine body 1 is provided with a plurality of cylinders. The engine body 1 of the present embodiment is provided with four cylinders. Hereinafter, a direction in which a plurality of cylinders of the cylinder block 2 are linearly arranged is referred to as a cylinder arrangement direction A (see FIG. 2), for the sake of description. An output shaft 1a is protruded from the cylinder block 2. Here, the axial direction of the output shaft 1a coincides with the cylinder arrangement direction A. The output shaft 1a is connected to a transmission or hybrid unit 9 which is disposed adjacent to the engine body 1. The transmission or hybrid unit 9 transmits a rotational driving force to traveling wheels via a drive shaft (not shown). Note that the engine body 1 of the present embodiment has the cylinder arrangement direction A in line with the axial direction of the output shaft 1a, and when mounted in the vehicle, the cylinder arrangement direction A matches the vehicle width direction. For this reason, the cylinder arrangement direction A is orthogonal to the vehicle front-rear direction. The cylinder arrangement direction A is not particularly limited, and includes a case where the cylinder arrangement direction A runs along the vehicle front-rear direction, such as a case of in-line four cylinders or in-line six cylinders. In addition, the axial direction of the cylinder may be tilted.

A resin intake manifold 5 is provided on a side surface 1b, on the intake side, of the cylinder head 3. An intake system 6 is connected to the resin intake manifold 5. The intake system 6 mainly includes: an air cleaner 12 provided on the upper surface of the engine body 1; an intake opening member 13 having an intake port 13a; an intake passage 14 to guide air, which has been taken through the intake opening member 13 and has passed through the air cleaner 12, to the resin intake manifold 5; a supercharger 17 (see FIG. 4) provided in the middle of the intake passage 14; and an intercooler 106 (see FIG. 2) as a heat exchanger.

The intake opening member 13 has the air inlet 13a formed open at a front portion of the vehicle. The intake opening member 13 takes air through the intake port 13a and introduces it into the intake passage 14. The intake passage 14 guides intake air through the air cleaner 12 to the resin intake manifold 5 provided in the engine body 1.

The intake passage 14 has a first intake passage 14a and a second intake passage 14b. Among these, the first intake passage 14a guides the air taken through the intake port 13a of the intake opening member 13 to the air cleaner 12. The second intake passage 14b is configured to guide the air from the air cleaner 12 to the resin intake manifold 5 of the engine body 1 through the supercharger 17, the intercooler 106, and a throttle valve 20.

As shown in FIG. 1, the second intake passage 14b includes the supercharger 17, a low-pressure intake passage 15a connected upstream in the intake direction of the supercharger 17, a high-pressure intake passage 15b connected downstream in the intake direction of the supercharger 17, and the throttle valve 20. Among these, the low-pressure intake passage 15a includes a first connection member 101 having one end connected to the air cleaner 12, an upper pipe 102 connected to the other end of the first connection member 101, and a second connection member 103.

The first connection member 101 is bent and communicates the internal space of the air cleaner 12 with the internal space of the upper pipe 102. The upper pipe 102 has substantially the same pipe diameter as the first connection member 101 and the second connection member 103. An air bypass valve 200 to be described below is provided on the upper surface of the upper pipe 102. The second connection member 103 has one end connected to the upper pipe 102 and the other end connected to a compressor inlet side opening 17a of the supercharger 17. Thus, the air cleaner 12 communicates with the supercharger 17 through the first connection member 101, the upper pipe 102, and the second connection member 103.

The intake system 6 has the high-pressure intake passage 15b turned back at the supercharger 17 with respect to the low-pressure intake passage 15a. The low-pressure intake passage 15a and the high-pressure intake passage 15b are disposed on a left side surface 1d of the engine body 1 so as to be close to each other. The low-pressure intake passage 15a and the high-pressure intake passage 15b extend so as to at least partly overlap with each other in the up-down direction V (substantially parallel to the cylinder axis direction). The high-pressure intake passage 15b of the present embodiment is disposed on the left side surface 1d of the engine body 1 and below the low-pressure intake passage 15a, along a vehicle front-rear direction C so as to be substantially parallel to the low-pressure intake passage 15a, as shown in FIG. 1. In addition, the low-pressure intake passage 15a and the high-pressure intake passage 15b in the present embodiment are located above the transmission or hybrid unit 9 disposed adjacent to the left side surface 1d of the engine body 1.

The high-pressure intake passage 15b includes a third connection member 105, a fourth connection member 107, and the intercooler 106 interposed between the third connection member 105 and the fourth connection member 107. Among these, the third connection member 105 is bent and has one end connected to a compressor outlet side opening 17b of the supercharger 17. The other end of the third connection member 105 is connected to one end of the intercooler 106.

In addition, the fourth connection member 107 is connected to an opening on the other end of the intercooler 106. The fourth connection member 107 has an internal passage shaped to change a ventilation direction from the vehicle front-rear direction C to the cylinder arrangement direction A at a substantially right angle (see FIG. 12). A downstream end of the fourth connection member 107 is connected to the throttle valve 20. In the present embodiment, the position in the up-down direction V of the fourth connection member 107 located at the outlet of the intercooler 106 is set to have the same height as that in the up-down direction V of the throttle valve 20 provided in the engine body 1.

Further, the intercooler 106 is provided with a refrigerant passage (not shown). Then, heat is exchanged between the refrigerant passing through the refrigerant passage and the air passing through the intercooler 106. This allows the intercooler 106 to cool the intake air compressed by the supercharger 17 before being introduced into the engine body 1 from the throttle valve 20.

Figure 3:
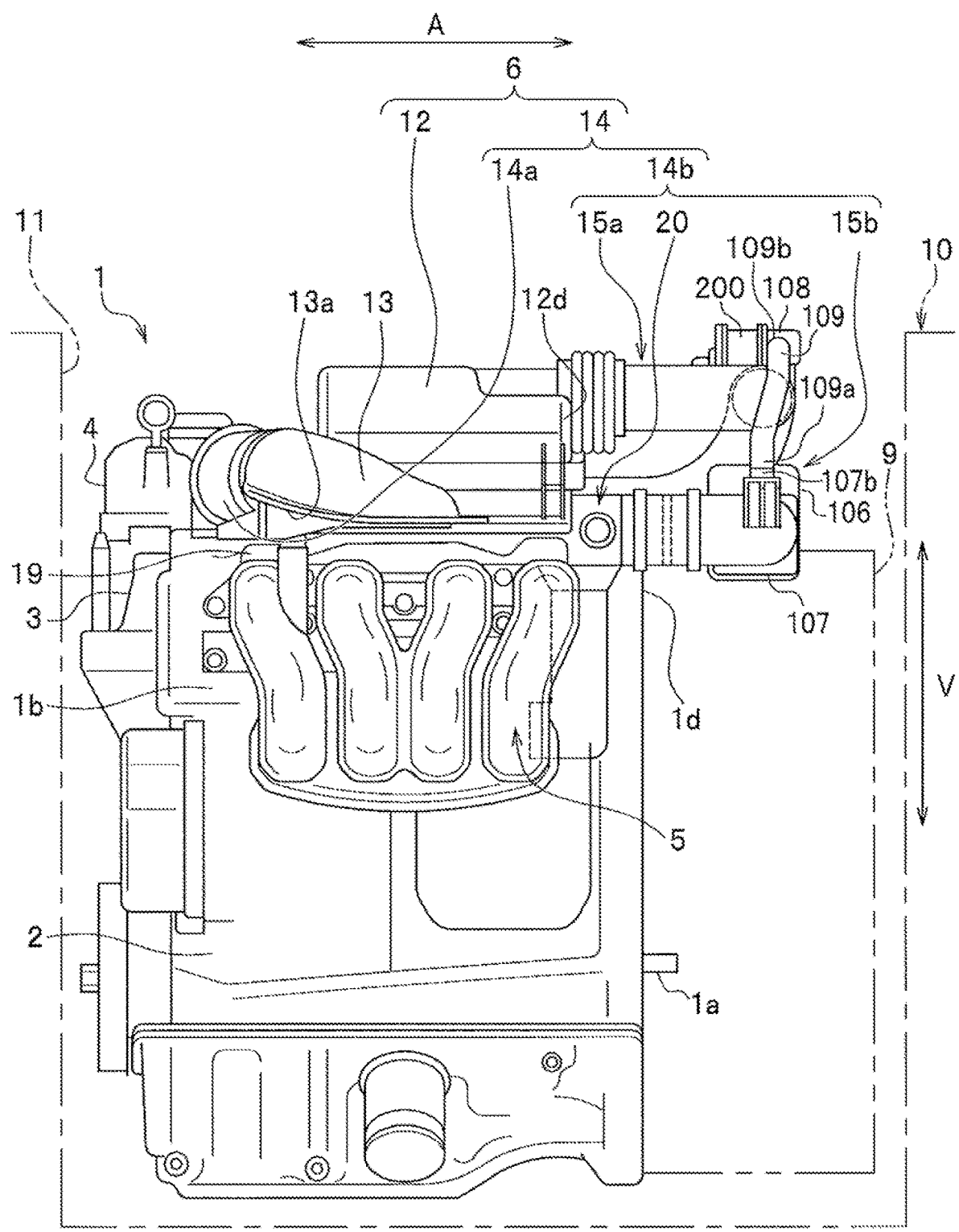
FIG. 3 is a front view of the engine peripheral structure to illustrate a configuration thereof, as the engine body mounted in the engine room viewed from in front of the vehicle.

As shown in FIG. 3, the low-pressure intake passage 15a has the air bypass valve 200 at a portion thereof overlapping in a top view with the high-pressure intake passage 15b. A chamber 108 is formed to bulge in the low-pressure intake passage 15a, longitudinally near the first connection member 101, so as to be integrated with an upper surface portion of the low-pressure intake passage 15a. Additionally, a bypass pipe 109 is provided in the high-pressure intake passage 15b. That is, a branch pipe 107b protrudes from an upper surface 107a of the fourth connection member 107. The branch pipe 107b has one end 109a of the bypass pipe 109 connected thereto. The other end 109b of the bypass pipe 109 is connected to the chamber 108. Thus, the internal space of the fourth connection member 107 communicates with the internal space of the chamber 108. Note that the bypass pipe 109 is routed in the present embodiment so as to overlap in a top view with the high-pressure intake passage 15b.

The air in the high-pressure intake passage 15b is introduced into a high pressure compartment of the air bypass valve 200 through the bypass pipe 109 and the chamber 108. That is, the air bypass valve 200, when opened, flows the high-pressure intake air from the air bypass valve 200 back into the low-pressure intake passage 15a. Therefore, when the throttle valve 20 is suddenly closed, the air bypass valve may be opened to let the high-pressure intake air flow back to the low-pressure intake passage 15a through the bypass pipe 109 and the chamber 108, without the air flowing backward toward the intercooler 106. This inhibits the high-pressure intake air from flowing backward to the supercharger 17 to have no surge in the supercharger 17, so that the supercharger 17 and the intercooler 106 have less burden and then are protected, and no surge noise is generated.

Figure 4:
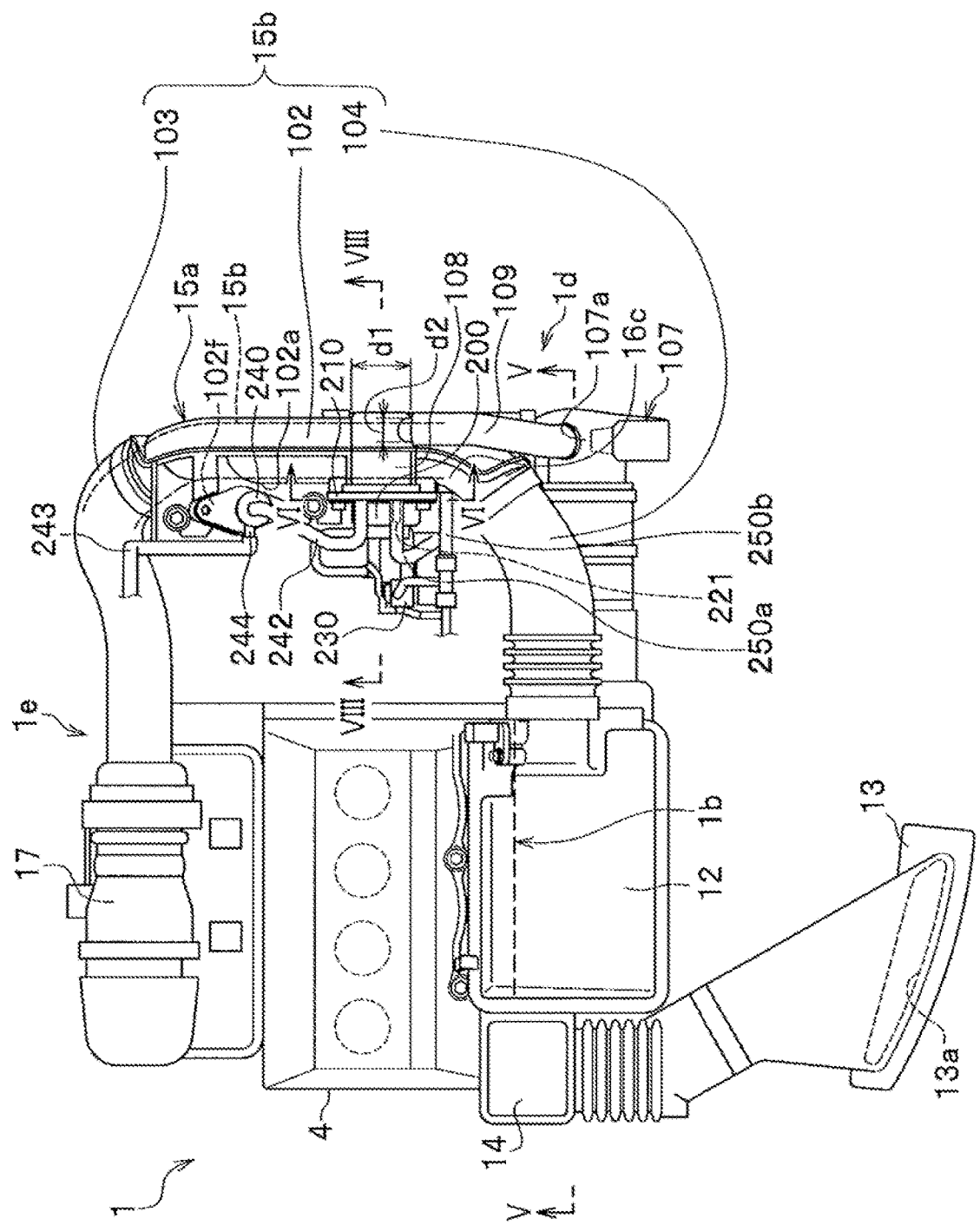
FIG. 4 is a top view of the engine peripheral structure to illustrate a configuration thereof, as the engine body mounted in the engine room viewed from above the vehicle.

In the present embodiment, the low-pressure intake passage 15*a* and the high-pressure intake passage 15*b* extend so as to overlap all over with each other in a top view of the engine room 11 (see FIG. 4). More specifically, the low-pressure intake passage 15*a* and the high-pressure intake passage 15*b* extend so as to overlap substantially all over with each other, in a top view of the engine room 11, on the left side of the engine body 1, that is, substantially all over from the side surface 1*b* on the intake side to a side surface 1*e* of the engine body 1 on the exhaust side in a substantially U shape with the left side surface 1*d* at the center, as shown in FIG. 4.

In the engine peripheral structure of the embodiment configured as described above, the air taken in from the intake port 13*a* of the intake opening member 13 passes through the first intake passage 14*a* and the air cleaner 12 to the second intake passage 14*b* and the supercharger 17, and then is cooled by the intercooler 106 before passing through the throttle valve 20. The air passed through the throttle valve 20 is introduced into the engine body 1 from the resin intake manifold 5 through a surge tank (not shown).

Next, a description is given of effects of the engine peripheral structure of the present embodiment. In the vehicle 10 according to the embodiment configured as described above, the low-pressure intake passage 15*a* and the high-pressure intake passage 15*b* extend so as to at least partly overlap with each other in a top view of the engine room 11, as shown in FIGS. 1 to 3. This allows the low-pressure intake passage 15*a* and the high-pressure intake passage 15*b* to be compactly laid out on the left side surface 1*d* of the engine body 1 in the front-rear and/or right-left directions.

In addition, the intercooler 106 is provided in the high-pressure intake passage 15*b* located on the left side surface 1*d* of the engine body 1. This facilitates piping for refrigerant for the intercooler 106, and allows for a further compact layout, as compared with the case where the intercooler 106 is provided at another location. In particular, the liquid-cooled or water-cooled intercooler 106 can be easily reduced in size, as compared with an air-cooled heat exchanger. The intercooler 106 facilitates piping involving water, as compared with the case where an intercooler is provided in front of the engine body 1 and near a radiator, for example.

Further, the height of the fourth connection member 107 located at the outlet of the intercooler 106 is aligned with that of the throttle valve 20. This allows for setting a distance for the air cooled by the intercooler 106 to reach the throttle valve 20 to be the shortest. Accordingly, the engine body 1 has an improved response.

In the present embodiment, the low-pressure intake passage 15*a* has the air bypass valve 200 at a portion overlapping, in a top view, with the high-pressure intake passage 15*b*. The second intake passage 14*b* guides the air from the air cleaner 12 to the engine body 1 through the supercharger 17, the intercooler 106, and the throttle valve 20. The air bypass valve 200 opens the air bypass valve, when the throttle valve 20 is suddenly closed, to let the high pressure intake air flow back into the low-pressure intake passage 15*a* to protect the intercooler 106. Additionally, the high-pressure intake passage 15*b* is routed so as to overlap, in a top view, with the bypass pipe 109 communicably connected to the air bypass valve 200. The fourth connection member 107 of the high-pressure intake passage 15*b* is connected upward to the chamber 108 via the bypass pipe 109 with a short piping distance, as shown in FIG. 1. This allows for a further compact layout.

Furthermore, in the present embodiment, the low-pressure intake passage 15*a* and the high-pressure intake passage 15*b* extend so as to overlap with each other in a top view of the engine room 11, substantially all over from the left side surface 1*d* to the side surface 1*e* on the exhaust side in a substantially U shape, as shown in FIG. 4. Thus, the low-pressure intake passage 15*a* and the high-pressure intake passage 15*b* vertically overlap with each other not only on the left side surface 1*d* but also on the side surface 1*b* on the intake side and the side surface 1*e* on the exhaust side, to protrude less outward from the engine body 1. This allows for a further compact layout of the piping of the intake system 6.

Particularly in the present embodiment, the liquid-cooled intercooler 106 is reduced in size and the low-pressure intake passage 15*a* and the high-pressure intake passage 15*b* extend so as to overlap with each other in a top view of the engine room 11 (see FIG. 4). This allows for using a space under the intercooler 106 to mount the transmission or hybrid unit 9, as shown in FIG. 3, to implement a further compact layout in the engine room 11.

The present embodiment is provided with the engine body 1 mounted in the engine room 11, the intake system 6 connected to the engine body 1, and the supercharger 17 provided in the middle of the intake system 6. The intake system 6 includes the low-pressure intake passage 15*a* connected upstream in the intake direction of the supercharger 17, and the high-pressure intake passage 15*b* connected downstream in the intake direction of the supercharger 17. The intake system 6 extends on a side surface of the engine body 1, which is substantially parallel to the axis direction of the cylinder in the engine body 1, so that the low-pressure intake passage 15*a* and the high-pressure intake passage 15*b* at least partly overlap with each other in the up-down direction V, which is substantially parallel to the axis direction of the cylinder.

The engine peripheral structure of the embodiment configured as described above allows for a further compact layout of the piping of the intake system 6.

FIGS. 4 to 8 illustrate the structure around the air bypass valve 200 in the engine peripheral structure. The intake system 6 of the present embodiment is provided with the air bypass valve 200. The air bypass valve 200 is configured to let air flow into the low-pressure intake passage 15*a* when the high-pressure air in the high-pressure intake passage 15*b* rises in pressure to a predetermined pressure. The air bypass valve 200 of the present embodiment is attached to a portion, which faces the engine body 1, of the low-pressure intake passage 15*a*.

Figure 8:
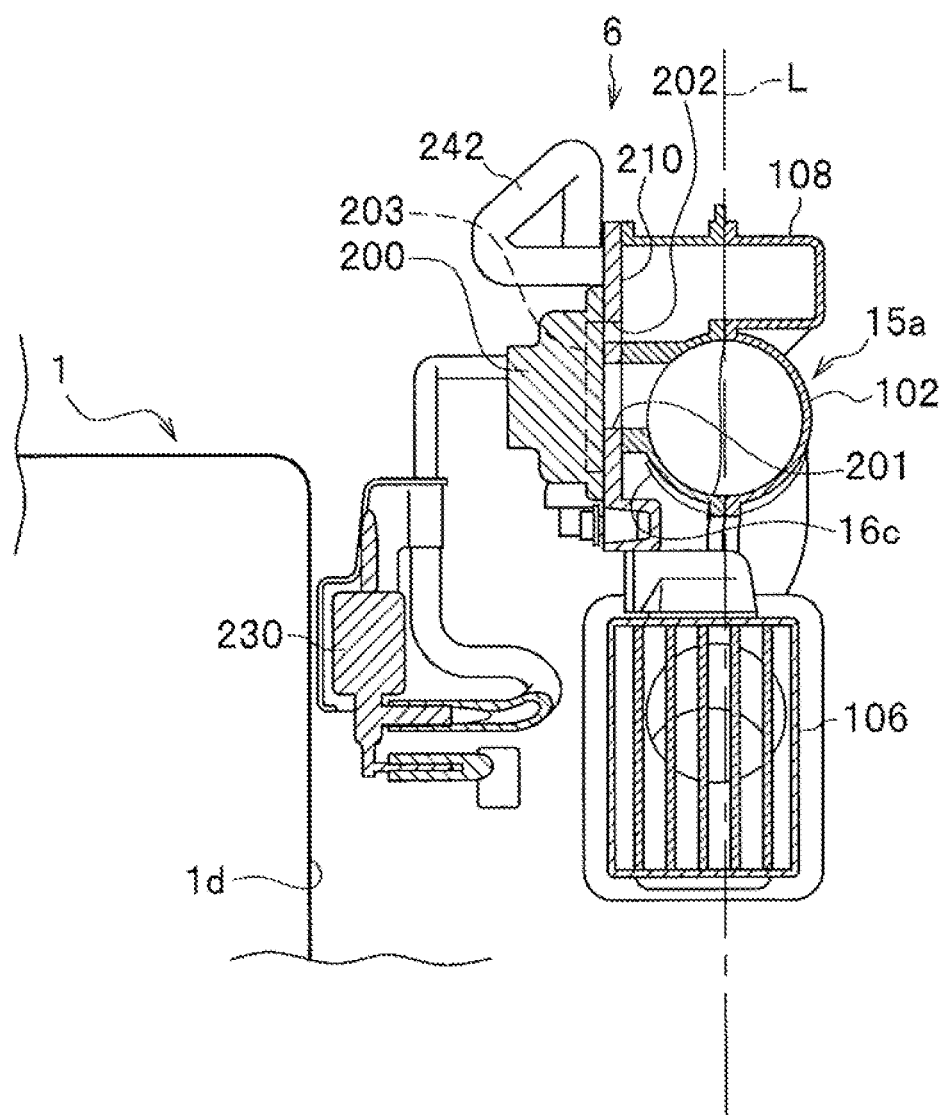
FIG. 8 is a perspective view of the engine peripheral structure taken along a line VIII-VIII in FIG. 1 to illustrate the internal structure of the air bypass valve.

The air bypass valve 200 is provided entirely within a domain of the low-pressure intake passage 15*a*, located on a side, closer to the engine body 1, of an imaginary line L running through the center of the low-pressure intake passage 15*a* and being parallel to the axial direction of the cylinder of the engine body 1, in a cross-sectional view taken across the intake flow direction of the low-pressure intake passage 15*a*, as shown in FIG. 8.

Figure 6:
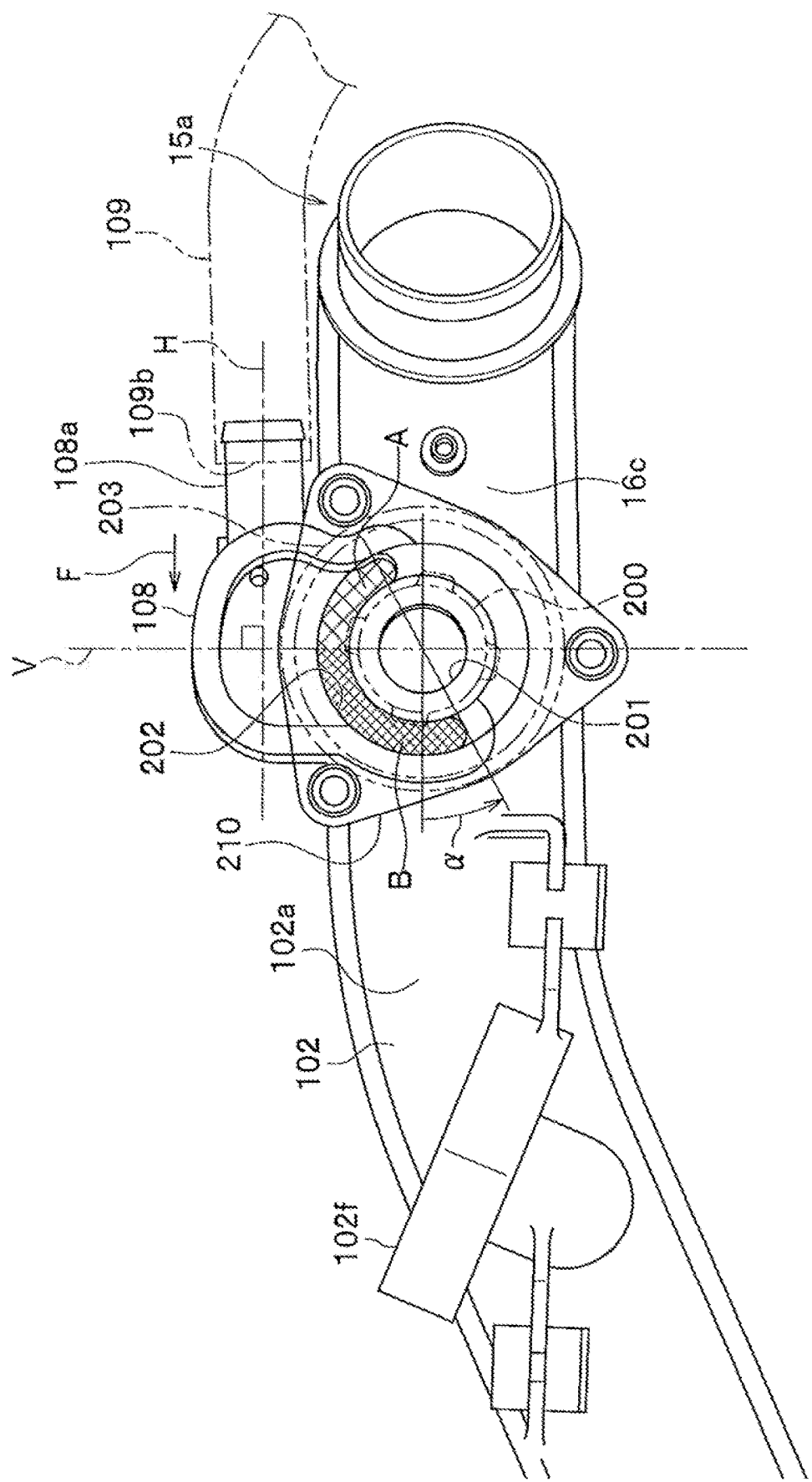
FIG. 6 is a perspective view of the engine peripheral structure to illustrate an internal structure of the air bypass valve taken along a line VI-VI in FIG. 4.

In addition, the chamber 108 is provided on the upper surface of the low-pressure intake passage 15*a* at a position to face the engine body 1. As shown in FIG. 6, a pipe-shaped joint portion 108*a* protrudes frontward from the chamber 108, with an axial direction thereof orienting in the vehicle front-rear direction. The joint portion 108a has an end of the bypass piping 109 connected thereto. The internal space of the chamber 108 thus communicates with the internal space of the high-pressure intake passage 15b.

Further, an end surface of the chamber 108 at a position to face the engine body 1 is connected to the air bypass valve 200 via a connection plate member 210, as shown in FIG. 4.

As shown in FIG. 6, the air bypass valve 200 includes an outlet side opening 201 connected to the upper pipe 102 of the low-pressure intake passage 15a, an air introduction hole 202 formed around the outlet side opening 201 so as to be open to communicate with the chamber 108, and an on-off valve 203 to open or close the outlet side opening 201 and the air introduction hole 202 depending on a pressure difference between the inside and outside of the end surface. The air introduction hole 202 extends in the circumferential direction about the outlet side opening 201, to have a semi-annular shape (about 180 degrees) with the upper half open. The air introduction hole 202 is formed to have two regions, with an imaginary line V as a boundary being perpendicular to an axis H of the bypass pipe 109, at the joint part 108a which is a connection part between the chamber 108 and the bypass pipe 109, and running through the center of the outlet side opening 201, where one region A is on a side closer to the connection part and the other region B is on the opposite side to the connection part with respect to the boundary and the area of the region B is larger than that of the region A. That is, the air introduction hole 202 is offset by rotating an angle of "α" about the outlet side opening 201 toward a connection direction F so that the area of the region B, or the other opening, increases with the virtual line V as a boundary. Specifically, the air introduction hole 202 has an opening range thereof offset by an angle of "α" in the flow direction (counterclockwise in the drawing) of the air introduced as a vortex flow from the chamber 108. The center of rotation coincides with the center position of the outlet side opening 201.

Figure 7:
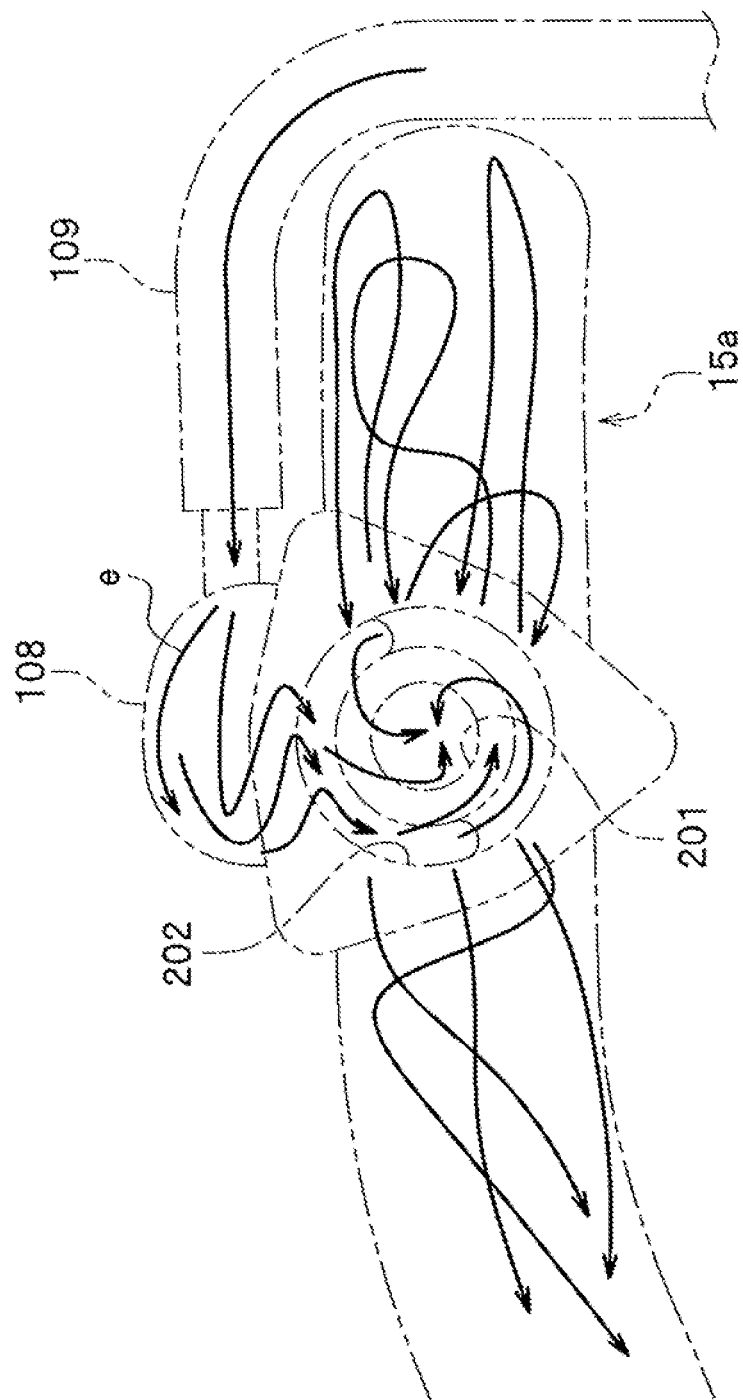
FIG. 7 illustrates flow lines of the air flowing into the air bypass valve.

This causes the air "e" flowing into the chamber 108 from the bypass pipe 109, when passing through the air bypass valve 200 from the chamber 108, to pass through the air introduction hole 202 and the outlet side opening 201, which are opened by the on-off valve 203, in a swirling flow and to smoothly flow back to the inside of the low pressure intake passage 15a, as shown in FIG. 7.

A solenoid 230 for controlling the pressure is provided between the left side surface 1d of the engine body 1 and the intake system 6, as shown in FIG. 8. In addition, a connection joint 221 for deriving pressure from the high-pressure intake passage 15b is provided in the chamber 108 on a side closer to the engine body 1 (see FIG. 5). The connection joint 221 is disposed adjacent to a joint 16g provided in the low-pressure intake passage 15a.

Figure 5:
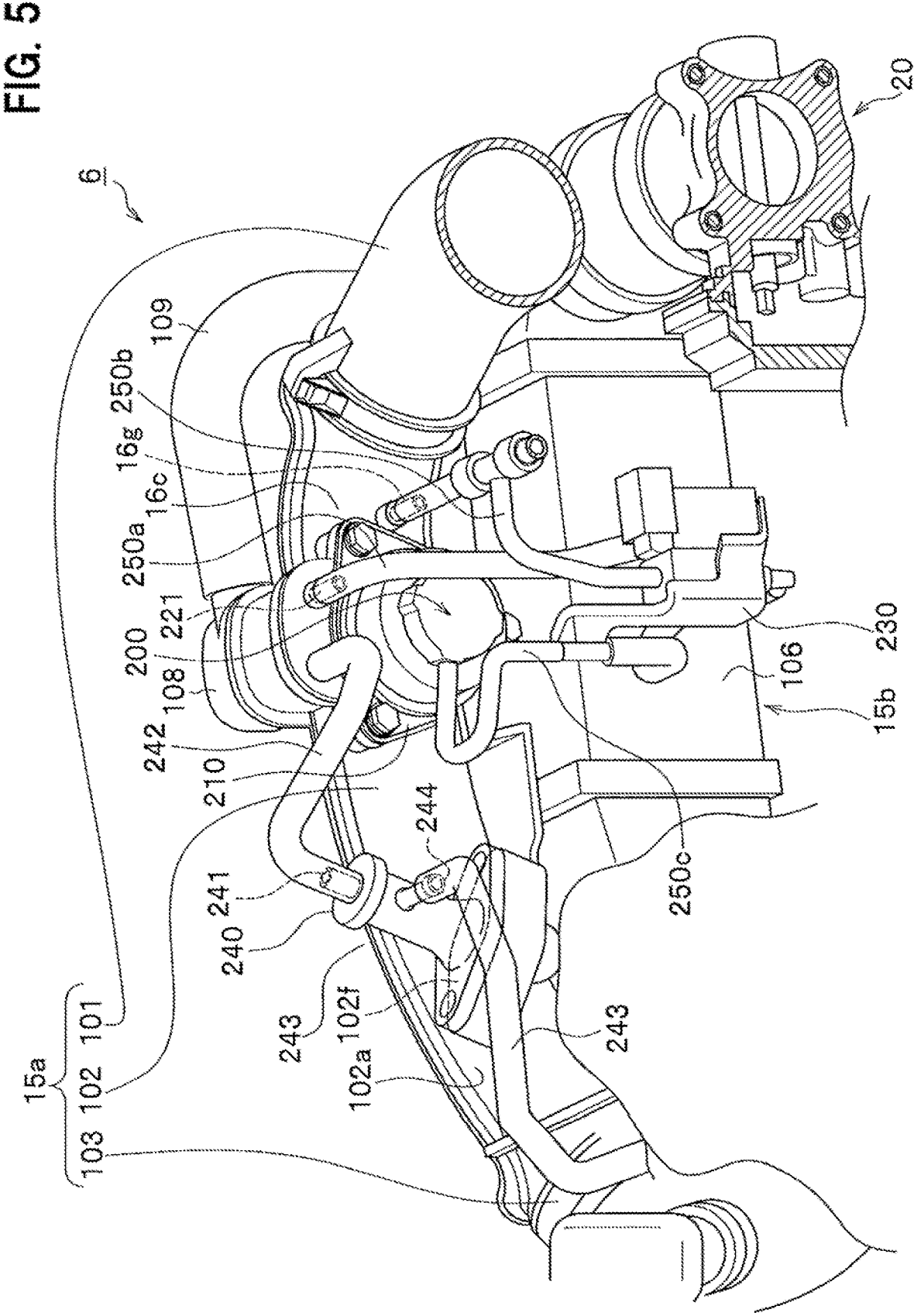
FIG. 5 is a perspective view, as viewed from the engine body, of the engine peripheral structure to illustrate a configuration around an air bypass valve.

Further, as shown in FIG. 5, a seat surface 102f having a flat upper surface is formed on a side surface 102a, facing the engine body 1, of the upper pipe 102. A jet purge device 240 is attached to the seat surface 102f. The jet purge device 240 is integrally formed with a high-pressure side joint 241 and a purge side joint 244. In addition, a high-pressure pipe 242 for deriving the pressure in the chamber 108 extends from the connection plate member 210 to which the air bypass valve 200 is mounted. A front end of the high-pressure pipe 242 is connected to one end of the high-pressure side joint 241. A jet outlet 241a is formed at the tip of a nozzle located on the other end of the high-pressure side joint 241 (see FIG. 9). The jet purge device 240 is configured to generate pressure by the pressurized air ejected from the jet outlet 241a of a jet nozzle 245 to flow the fuel vapor introduced from a vapor introduction pipe 243 back into the low-pressure intake passage 15a, while the supercharger 17 is in operation.

Furthermore, the solenoid 230 is provided on a side, closer to the engine body 1, of the upper pipe 102 of the low-pressure intake passage 15a in the present embodiment, as shown in FIG. 5. The solenoid 230 of the present embodiment is disposed in the vicinity of the air bypass valve 200, overlapping with the air bypass valve 200 in the vehicle front-rear direction but at a different location below the valve in the vehicle up-down direction (see FIG. 8).

The joint 16g is integrally protruded from a side surface 16c, facing the engine body, in the vicinity of the air bypass valve 200 of the upper pipe 102, as shown in FIG. 5. The solenoid 230 is connected with the connection joint 221 via a high-pressure derivation pipe 250a. The solenoid 230 is also connected to the joint 16g via a low-pressure derivation pipe 250b. The solenoid 230 is also connected to the air bypass valve 200 via a pipe 250c. An ECU (not shown) determines whether the air bypass valve 200 should be opened or closed, based on detected values such as by pressure sensors 301 (T-MAP sensors) provided upstream and downstream of the throttle valve 20, and information such as an opening level of the throttle valve 20. The solenoid 230 opens the air bypass valve 200 (sends negative pressure) or closes the air bypass valve 200 (sends positive pressure), based on the determination by the ECU.

In the present embodiment, the air bypass valve 200 is mounted to a portion of the low-pressure intake passage 15a facing the engine body 1, as shown in FIGS. 4 to 8. This allows the air bypass valve 200 to less protrude outward from the engine body 1. Additionally, in the present embodiment, the chamber 108 and the bypass pipe 109 connected to the outer side of the air bypass valve 200, which is mounted on a side, closer to the engine body 1, of the low-pressure intake passage 15a overlap with the low-pressure intake passage 15a in the vehicle width direction, as shown in FIG. 4. This allows the chamber 108 and the bypass pipe 109 to less protrude outward from the air bypass valve 200. Therefore, a valve layout is made compact to have a structure with good space efficiency.

In addition, the air bypass valve 200 is arranged closer to the engine body 1 with respect to the center of the low-pressure intake passage 15a, as shown in FIG. 8. In the present embodiment, the air bypass valve 200 is provided entirely within a domain of the low-pressure intake passage 15a, on a side, closer to the engine body 1, of the imaginary line L running through the center of the low-pressure intake passage 15a and being parallel to the axial direction of the cylinder of the engine body 1, in a cross-sectional view taken across the intake flow direction of the low-pressure intake passage 15a. That is, the air bypass valve 200 is disposed between the side surface of the low-pressure intake passage 15a and the left side surface 1d of the engine body 1. For this reason, the entire air bypass valve 200 and a part of the chamber 108 are disposed so as not to protrude outward from the imaginary line L located at the center of the low pressure intake passage 15a. Therefore, a valve layout structure with better space efficiency is provided.

Further, the chamber 108 is provided with a connection joint to derive high-pressure intake air to the engine body 1. As shown in FIG. 5, the high-pressure outlet pipe 250a connected to the chamber 108 is disposed adjacent to the low-pressure outlet pipe 250b connected to the low-pressure intake passage 15a. This allows the high-pressure outlet piping 250a and the low-pressure outlet piping 250b to be routed in the shortest distance to various sensors requiring high-pressure intake air and low-pressure intake air, such as the solenoid 230, leading to a simple and compact layout.

Still further, as shown in FIG. 6, the air introduction hole 202 is formed to have two regions, with the imaginary line V as a boundary being perpendicular to the axis H of the bypass pipe 109, at the joint part 108a which is a connection part between the chamber 108 and the bypass pipe 109, and running through the center of the outlet side opening 201, where the other region B on the opposite side to the connection part with respect to the boundary has a larger area than the one region A on the side closer to the connecting part. The air introduction hole 202 extends in the circumferential direction about the outlet side opening 201, to have a semi-annular shape (about 180 degrees) with the upper half open. This causes the air introduced through the chamber 108 to have a swirling flow through the semi-annular air introduction hole 202 and flow back to the low-pressure intake passage 105a with a small airflow resistance. Therefore, the smooth air flow allows for reducing a time loss when the air is released through the air bypass valve 200.

Still further, the seat surface portion 102f of the jet purge device 240 is provided in the upper pipe 102 of the low-pressure intake passage 15a, as shown in FIG. 5. This facilitates a piping layout.

Still further, the solenoid 230 to control the air bypass valve 200 is provided so as to be closer to the engine body 1 than the upper pipe 102, as shown in FIG. 8. The solenoid 230 controls to open or close the air bypass valve 200, based on opening/closing information determined by the ECU (not shown) based on detected values such as by T-MAP sensors provided upstream and downstream of the throttle valve 20 and information such as an opening level of the throttle valve 20. That is, the solenoid 230 is connected with the joint 16g provided on the side surface of the upper pipe 102 to face the engine body 1, in the vicinity of the air bypass valve 200, and the connection joint 221, via the low-pressure derivation pipe 250b and the high-pressure derivation pipe 250a, respectively. This allows the high-pressure derivation pipe 250a for high-pressure intake and the low-pressure derivation pipe 250b for low-pressure intake to be connected to the solenoid 230 at short distances. Therefore, the piping from the solenoid 230 to the air bypass valve 200 is laid out simply and compactly. This improves responsiveness of the air bypass valve 200 controlled by the solenoid 230, for example.

Figure 9:
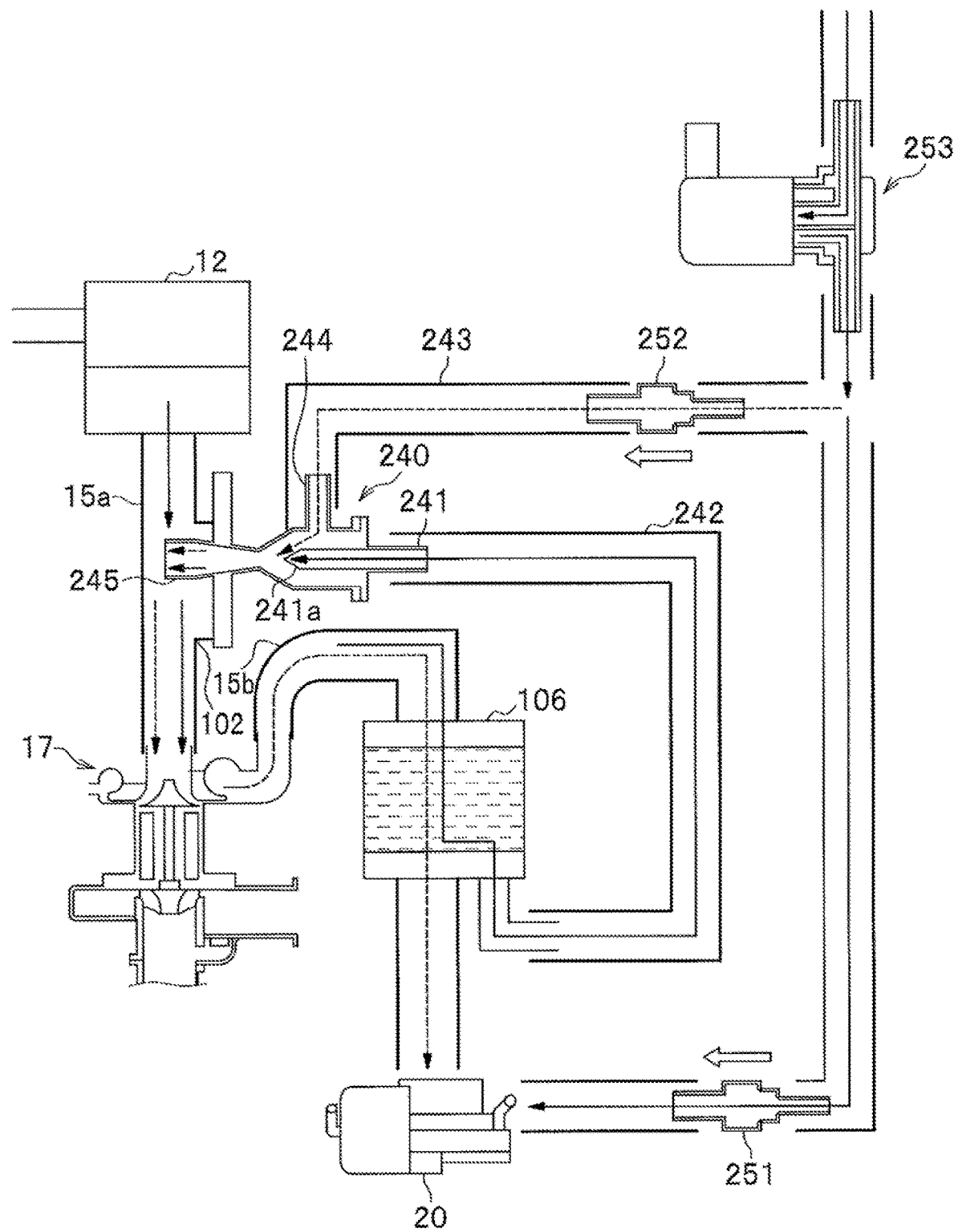
FIG. 9 is a circuit diagram in the engine peripheral structure to show an intake system and a flow of vapor.

Next, the intake system 6 and the vapor flow in the present embodiment will be described with reference to FIG. 9. In a state where supercharging by the supercharger 17 is not in operation, a first check valve 251 is open and a second check valve 252 is closed. The vapor taken through a canister (not shown) passes through a purge control valve 253 and is sent from the first check valve 251 to the throttle valve 20. The vapor is mixed with air in the throttle valve 20 and burned in the engine body 1.

In contrast, when the supercharger 17 is in operation, the supercharged air is supplied to the throttle valve 20 via the intercooler 106. At the same time, the air supercharged by the supercharger 17 is also sent to the jet purge device 240 at a predetermined pressure. During supercharging by the supercharger 17, the first check valve 251 is closed to prevent backflow due to high-pressure intake while the second check valve 252 is open. The vapor passes through the purge control valve 253 and the second check valve 252 and is then taken by the jet purge device 240.

The vapor flown back from the vapor introduction pipe 243 to the low-pressure intake passage 15a is compressed again by the supercharger 17 by the force of air supercharged by the supercharger 17, and is sent to the throttle valve 20 via the intercooler 106. The vapor is mixed with air by the throttle valve 20 and burned in the engine body 1. In this way, purging can be continued even during supercharging by the supercharger 17.

Figure 10:
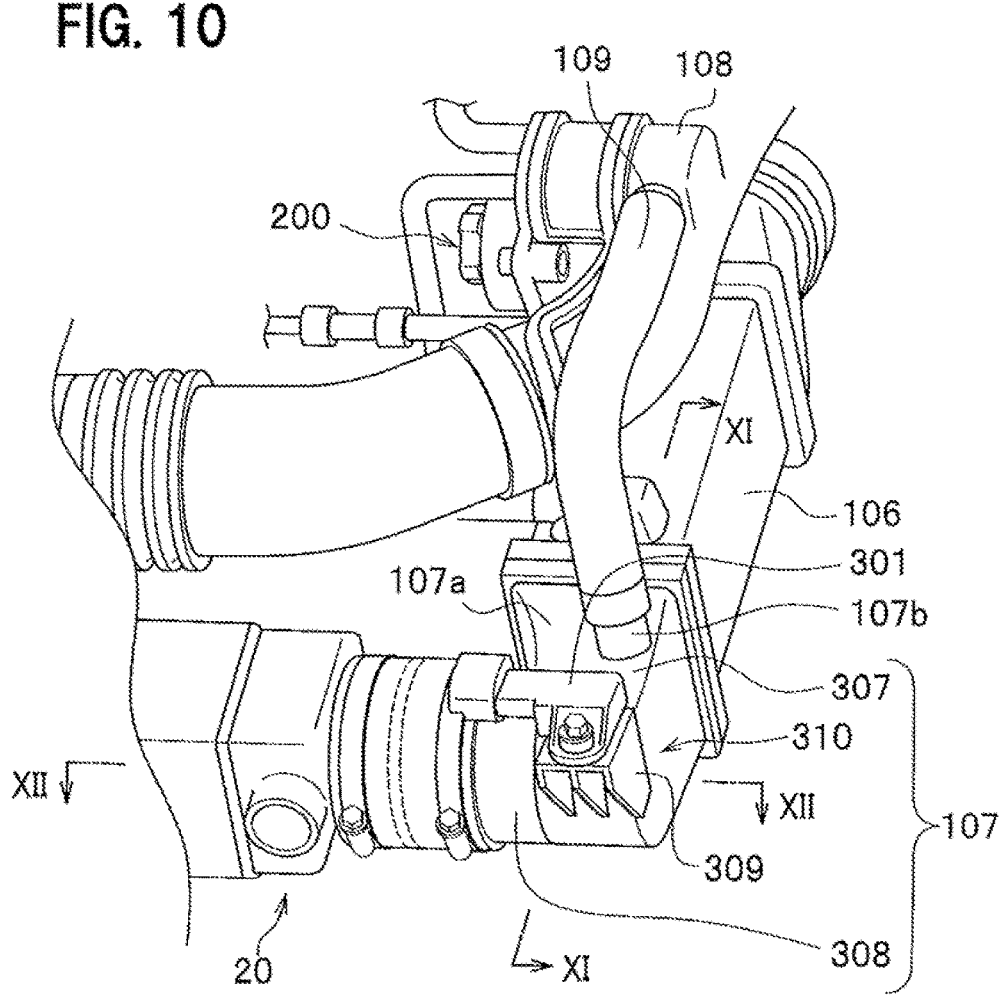
FIG. 10 is a perspective view of a sensor mounted portion of the engine peripheral structure, as viewed from diagonally above the vehicle.

FIGS. 10 to 13 show the engine periphery and illustrate the configuration around the outlet of the intercooler 106. The present embodiment includes the throttle valve 20 connected to the piping of the intake system 6 of the engine body 1, the pressure sensor 301 provided upstream, in piping of the intake system 6, of the throttle valve 20, and the intercooler 106. The piping of the intake system 6 is configured with an intake duct having one or more bent or curved bent portions. The pressure sensor 301 is provided on the fourth connection member 107 in the vicinity of the outer curved portion of the bent portion at the most downstream side of the intake duct as viewed from above the engine room 11. As shown in FIG. 10, the fourth connection member 107 has a rectangular tube portion 307 connected to the outlet portion of the intercooler 106 and a cylindrical portion 308 connected to the throttle valve 20. Each of the rectangular tube portion 307 and the cylindrical portion 308 is hollow and has an intake passage therein. The rectangular tube portion 307 and the cylindrical portion 308 are integrally formed to follow the arrangement of the intercooler 106 and the throttle valve 20, in a state where the axial directions thereof are orthogonal to each other at an angle of 90 degrees.

Figure 11:
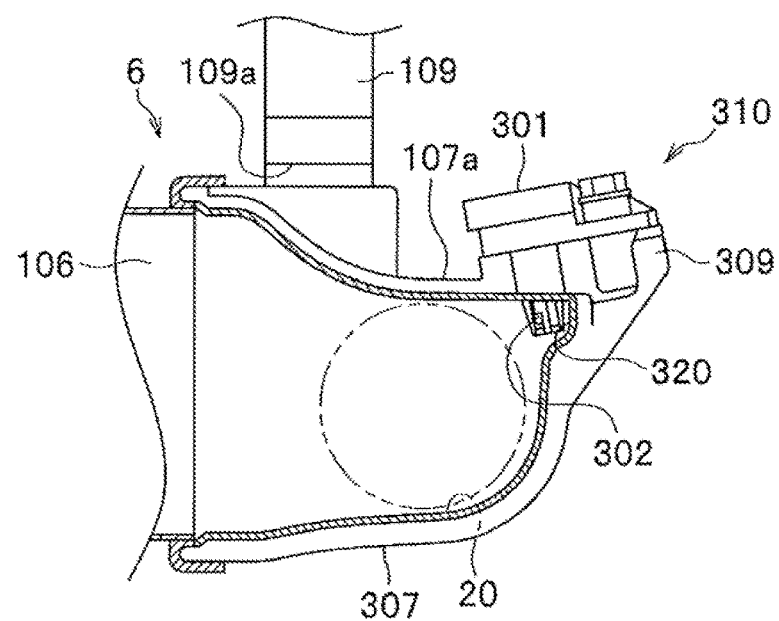
FIG. 11 is a cross-sectional view taken along a line XI-XI in FIG. 10 to illustrate a configuration of an intercooler in the engine peripheral structure at the periphery of an outlet portion.

Among these, the rectangular tube portion 307 has a pyramid shape, as shown in FIG. 11, so that the cross-sectional area of the channel decreases toward the downstream in the flow direction (rightward in the drawing). A mounting portion 310, to which the pressure sensor 301 is mounted, is provided at a protruding portion 309, located on the vehicle front side, of the rectangular tube portion 307.

Figure 13:
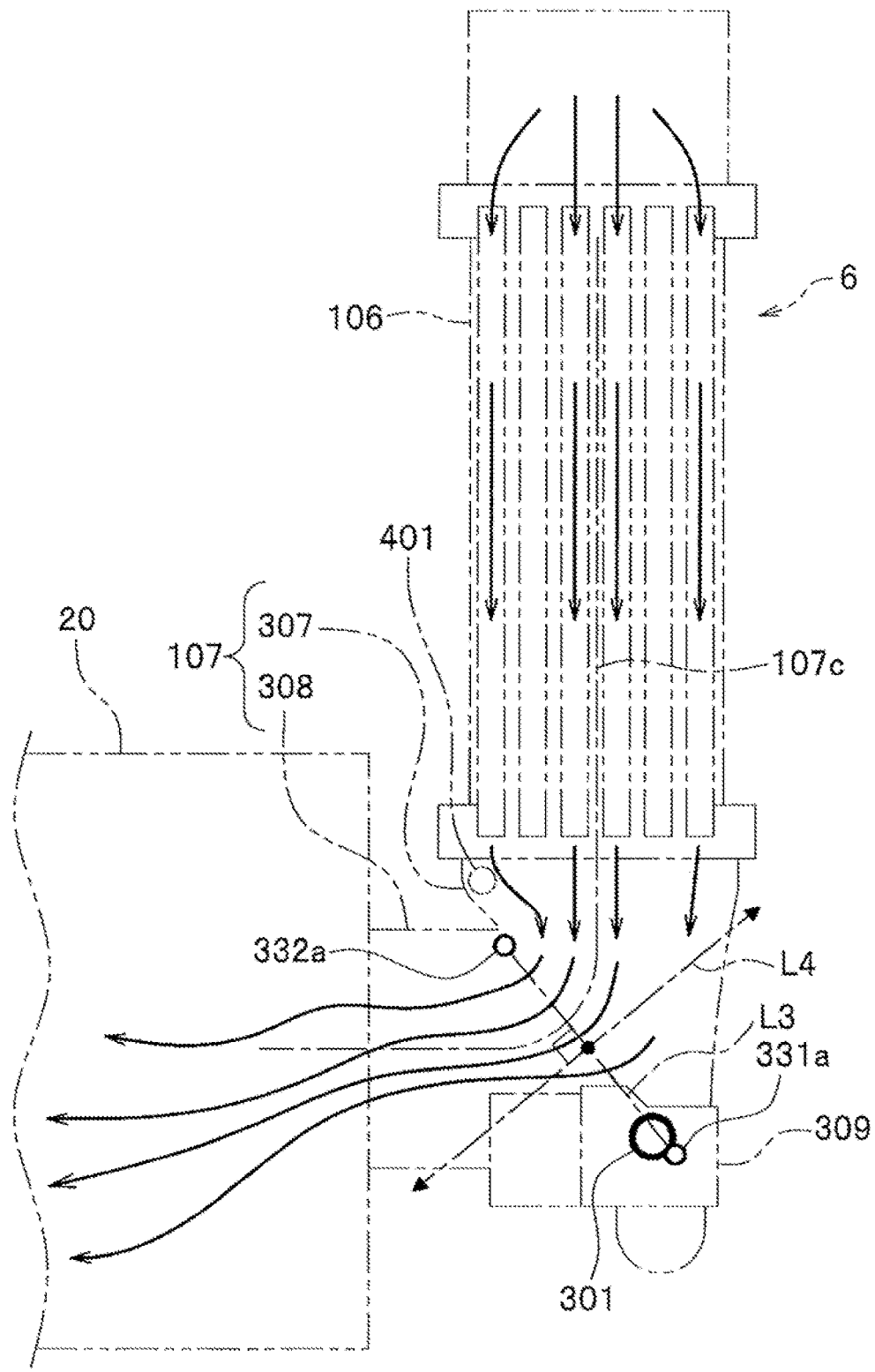
FIG. 13 is a schematic diagram as viewed from the position corresponding to that in FIG. 12 to illustrate the air flow in the intercooler at the periphery of the outlet portion.

In addition, in the present embodiment, assuming an imaginary line L3 connecting a vertex 331a of the outer bent portion of the bent portion 330 and a vertex 332a of the inner bent portion of the same and when an imaginary perpendicular bisector L4 of the imaginary line is drawn, the pressure sensor 301 is attached in the vicinity of the vertex 331a on a side, closer to of the outer bent portion, of the imaginary perpendicular bisector L4, as shown in FIG. 13.

Further, in the present embodiment, when the curvature of the outer bent portion of the bent portion 330 is constant as in FIG. 13, the central point between the start point and end point of the outer bent portion having said curvature is used as a reference. Note that in the case where the curvature of the inner bent portion of the bent portion 330 is constant, the central point between the start point and end point of the inner bent portion having the curvature may be used as a reference for the imaginary line. The pressure sensor 301 is attached in the vicinity of the vertex 331a on a side, closer to the outer bent portion, of the referential central point.

As shown in FIG. 11, a detection unit 302 is housed in a recess space 320 at a protruding portion protruding in a direction different from the direction to face the throttle valve, as viewed to the upstream side in the intake direction from the throttle valve 20, so as to be located outside of an outer wall line 333. In this way, the detection unit 302 is configured so as not to be directly impinged with the air flowing backward. In other words, the detection unit 302 is provided at a position not overlapping with the internal space of the throttle valve 20 along the central axis in the pipe length direction of the throttle valve 20, when projected on the downstream side in the intake direction, the position being outer than the outer wall line 333 of the cylindrical portion 308 at the bent portion 330 provided to the downstream end of the intake duct, as shown in FIG. 12.

Figure 12:
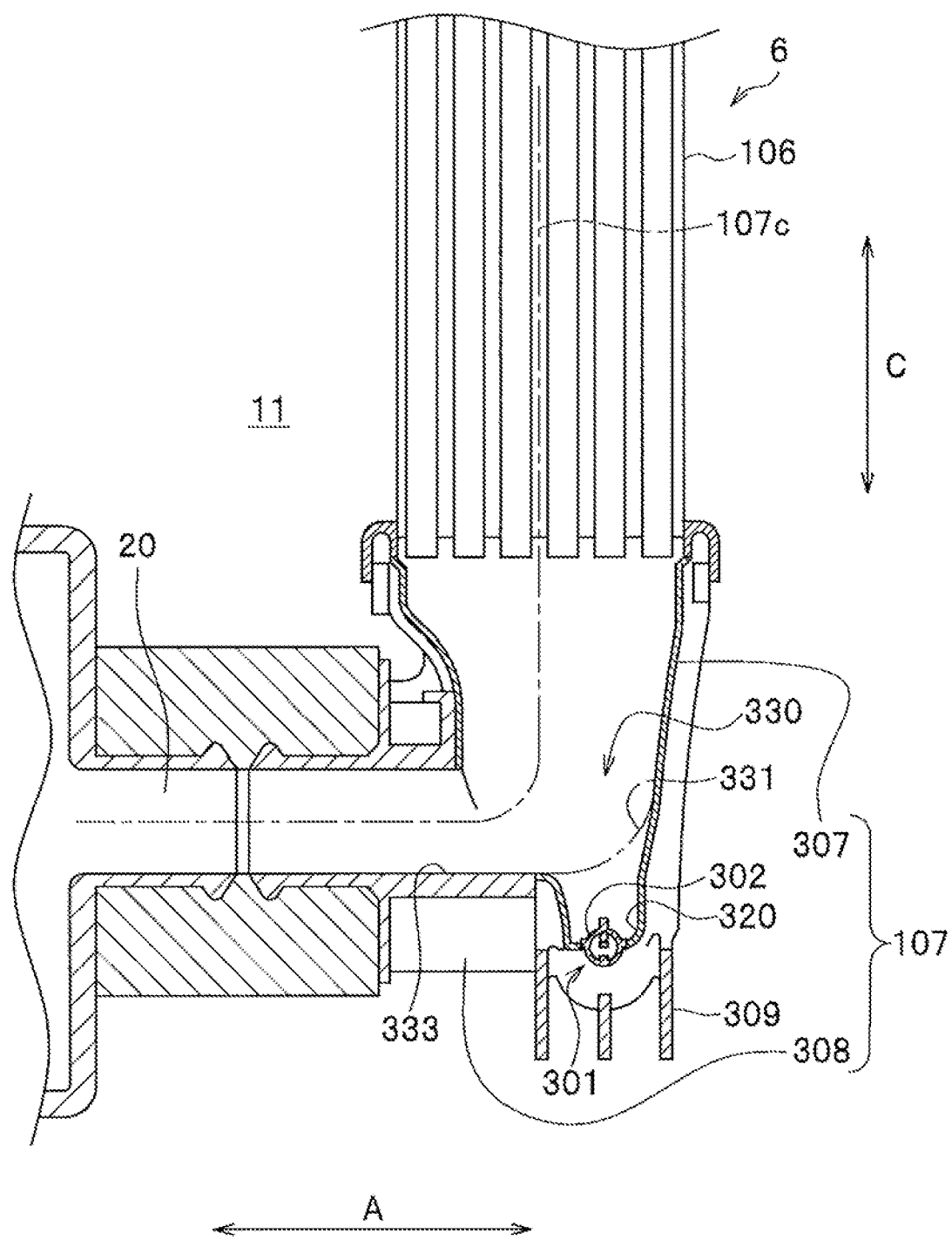
FIG. 12 is a cross-sectional view taken along a line XII-XII in FIG. 10 to illustrate a configuration of the intercooler in the engine peripheral structure at the periphery of the outlet portion.

Furthermore, the detection unit 302 of the pressure sensor 301 is disposed in the vicinity of an outer bent portion 331 of the bent portion 330, as shown in FIG. 12. The fourth connection member 107 is provided at the most downstream in the intake direction of the piping in the intake system 6. The bent portion 330 is located in the fourth connection member 107 as viewed from above the engine room 11. In the present embodiment, the detection unit 302 is provided so as to be housed in the recess space 320. This allows the detection unit 302 to accurately detect the air pressure in the intake duct at a deviated position so as not to be impinged with the main flow of the intake air sent from the outlet of the intercooler 106.

Moreover, the detection unit 302 of the present embodiment is provided in the protruding portion 309. The protruding portion 309 protrudes toward a direction, which is different from the direction to face the throttle valve 20, from the outer bent portion 331 of the bent portion 330 so as to be located outside in a radial direction of a bent arc and outside of the piping of the intake system 6, as viewed from above the engine room 11.

Next, a description is given of effects of the pressure sensor arrangement structure in the intake system of the present embodiment. In the vehicle 10 of the embodiment configured as described above, the recess space 320 defined in the protruding portion 309 allows the pressure sensor 301 to be less protruded from the inner surface of the pipe toward the main flow of the air flowing in the piping of the intake system 6. For example, the detection unit 302 does not protrude to any position in the inner surface of the throttle valve 20, as shown in FIG. 11, and inward of the pipe from the outer wall line 333 and the outer bent portion 331 of the bent portion 330, as shown in FIG. 12. The pressure sensor 301 is disposed so as to avoid the main flow of the intake air as described above, and therefore, even if the intake air flows backward in the piping of the intake system 6 such as when the throttle valve 20 is suddenly closed, the pressure sensor 301 is less susceptible to pressure fluctuations due to the backward flow. In addition, the detection unit 302, while being housed in the recess space 320, is capable of accurately detecting air pressure in the intake duct without being directly impinged with the main flow of the intake air sent from the outlet of the intercooler 106, as shown in FIG. 12. This allows for effectively detecting an accurate pressure.

In addition, the detection unit 302 of the pressure sensor 301, in a state of being attached to the inner surface on the upper side to define the recess space 320, as shown in FIG. 11, is fixed on a side, closer to the outer bent portion 331, of the imaginary perpendicular bisector L4 so as to be inclined to face to a different direction from that of the throttle valve 20, as shown in FIG. 13. This allows the detection unit 302 to be housed in the recess space 320 in a space-efficient manner, with no protrusion. In this way, the detection unit 302 in the recess space 320 is attached so as to avoid the main flow of intake air, and at an angle of not being directly impinged with the air flowing backward. This allows for accurately detecting the required air pressure in the intake duct, while the influence of the air flowing backward due to the throttle valve 20 being suddenly closed is reduced.

Further, when the curvature of the outer bent portion of the bent portion 330 is constant, the central point between the start point and end point of the outer bent portion having a constant curvature is used as the reference point of the imaginary line, as shown in FIG. 13. The pressure sensor 301 is attached in the vicinity of the vertex 331a on a side, closer to the outer bent portion, of the referential central point. In this embodiment, the detection unit 302 is provided outside the outer wall line 333, as shown in FIG. 12. Thus, even if the intake air flows backward in the piping of the intake system 6, the main flow of the air flowing backward does not directly impinge on the pressure sensor 301 provided in a slow-flow region. The detection unit 302 is therefore less likely affected by the air flowing backward through the bent portion 330, to detect pressure more accurately.

In particular in the present embodiment, assuming the imaginary line L3 connecting the vertex 331a of the outer bent portion of the bent portion 330 with the vertex 332a of the inner bent portion of the same and when the imaginary perpendicular bisector L4 of the imaginary line is drawn, as shown in FIG. 13, the pressure sensor 301 is attached in the vicinity of the vertex 331a on a side, closer to the outer bent portion, of the imaginary perpendicular bisector L4. Besides, when the curvature of the outer bent portion of the bent portion 330 is constant as in the present embodiment, the central point between the start point and end point of the outer bent portion having said curvature is used as a reference. Thus, the pressure sensor 301 is attached in the recessed space 320 in the bent portion 330, which is defined at a location away from the reference and is less likely affected by the air flowing backward, to allow the detection unit 302 to detect more accurate pressure.

Furthermore, as shown in FIG. 12, the detection unit 302 disposed in the vicinity of the outer bent portion 331 in the bent portion 330 at the most downstream in the intake direction allows for measuring accurate pressure of the air in the intake duct immediately before flowing into the throttle valve from the intake system 6.

Besides, the detection unit 302 is provided in the protruding portion 309 protruding outward of the intake system 6 from the outer bent portion 331 of the bent portion 330 in this embodiment, as viewed from above the engine room 11 in which the engine body 1 is mounted. Thus, even if the intake air flows backward in the piping of the intake system 6, the main flow is away from, and does not directly impinge on, the pressure sensor 301. Therefore, the detection unit 302 is less likely affected by the air flowing backward in the piping of the intake system 6, to allow for accurately measuring the pressure.

The present invention is not limited to the above-described embodiment, and various modifications can be made. The above-described embodiment is exemplified for the purpose of illustrating the present invention, and is not necessarily limited to those having all the configurations described above. A part of a configuration of an embodiment may be replaced with a configuration of another embodiment, and a configuration of an embodiment may be added with a configuration of another embodiment. Alternatively, a configuration of an embodiment may partly be deleted, or may be added or replaced with another configuration. Possible modifications to the above-described embodiment are as follows, for example.

In the engine peripheral structure of the present embodiment, the low-pressure intake passage 15a and the high-pressure intake passage 15b turned back at the supercharger 17, which is provided in the middle of the intake system 6, at least partly overlap with each other in the up-down direction V, and are disposed on the left side surface 1d of the engine body 1. However, the present invention is not limited thereto, and the low-pressure intake passage 15a and the high-pressure intake passage 15b may be disposed on the right side surface or the front/rear side surface of the engine body 1, for example. Additionally or alternatively, the low-pressure intake passage 15a and the high-pressure intake passage 15b may be disposed so as to extend over adjacent side surfaces. That is, the low-pressure intake passage 15a and the high-pressure intake passage 15b may be disposed on any side surface of the engine body 1.

In addition, the intercooler 106 is interposed between the third connection member 105 and the fourth connection member 107 in the high-pressure intake passage 15b, but the present invention is not limited thereto and the intercooler 106 may be disposed at another location, or may be dispensed with.

Further, the position in the up-down direction V of the fourth connection member 107 located at the outlet of the intercooler 106 is set to have the same height as that in the up-down direction V of the throttle valve 20. However, the present invention is not limited thereto and the position in the up-down direction V of the throttle valve 20 may be different from the position of the outlet of the intercooler 106.

Still further, the low-pressure intake passage 15a has the air bypass valve 200 above a portion thereof overlapping in a top view with the high-pressure intake passage 15b. However, the present invention is not limited thereto and the valve may be arranged at any location such as below the portion overlapping in a top view, and the overlapping ratio is not particularly limited either.

Still further, the one end 109a of the bypass pipe 109 is connected to the upper surface portion 107a of the fourth connection member 107 disposed downstream in the intake direction of the intercooler 106. However, the present invention is not limited thereto. For example, the one end 109a may be connected to any part of the high-pressure intake passage 15b, as long as high-pressure intake can be supplied from the high-pressure intake passage 15b to the air bypass valve 200.

Still further, in the present embodiment, the low-pressure intake passage 15a and the high-pressure intake passage 15b extend so as to overlap all over with each other in a top view of the engine room 11 (see FIG. 4). However, the present invention is not limited thereto. For example, they may extend so that at least a part of the low-pressure intake passage 15a overlaps with the high-pressure intake passage 15b on at least one side surface such as the left side surface 1d, and thus the shape, volume and material of each of the low-pressure intake passage 15a and the high-pressure intake passage 15b are not particularly limited.

Still further, the valve arrangement structure of the present embodiment has the air bypass valve 200 attached to a portion of the low-pressure intake passage 15a facing the engine body 1, as shown in FIG. 8 However, the present invention is not limited thereto. For example, the air bypass valve 200 may be attached to the side surface 16c of the low-pressure intake passage 15a to face the engine body 1, such as the air bypass valve 200 being provided under the low-pressure intake passage 15a, and thus the position, shape, volume and material of the air bypass valve 200 are not particularly limited.

Still further, the chamber 108 is provided on the upper surface side of the low-pressure intake passage 15a, and a diameter d1 of the chamber 108 is set to be larger than a diameter d2 of the bypass pipe 109 (d1>d2), as shown in FIG. 4. However, the present invention is not limited thereto and the chamber 108 may be dispensed with, or the shape, volume, and size of the chamber 108 are not particularly limited.

Still further, as shown in FIG. 6, the air introduction hole 202 extends in the circumferential direction about the outlet side opening 201, to have a semi-annular shape (about 180 degrees) with the upper half open and the opening range offset by an angle of "α," where α=30 degrees. However, the present invention is not limited thereto and the air introduction hole 202 may have the opening range being offset in the air flow direction (counterclockwise direction in the figure) by an angle of "α," where "α" falls within the range between 0 and 180 degrees, or may have the opening range widened on a side indicated by the direction F, toward which the bypass pipe 109 is connected to the low-pressure intake passage 15a, of the imaginary line V running through the center of the outlet side opening 201 and being perpendicular to the axis H of the bypass pipe 109 connected to the chamber 108. That is, the air introduction hole 202 has no particular limitation on the shape, volume, and size, as long as being formed to have two regions, with the imaginary line V as a boundary being perpendicular to the axis H of the bypass pipe 109, at the joint part 108a which is a connection part between the chamber 108 and the bypass pipe 109, and running through the center of the outlet side opening 201, where one region A is on the side closer to the connection part and the other region B is on the opposite side to the connection part with respect to the boundary, and the area of the region B is larger than that of the region A.

Still further, the positions of the connection joint 221, the seat surface 220 to which the jet purge device 240 is attached, the joint 16g, and the like are not particularly limited to those described above. These components may be provided at any positions, as long as the pipes are efficiently routed so as to have a short, desirably minimum, distance, for example.

Still further, the pressure sensor 301 does not protrude from the mounting portion 310, which is recessed in the protruding portion 309, in the intake system pressure sensor arrangement structure of the present embodiment. However, the present invention is not limited thereto and the position in the recess space 320, where the pressure sensor 301 is provided, is not limited, as long as being located in the vicinity of the outer bent portion 331 of the bent portion. That is, the pressure sensor 301 may be provided at a straight portion of the straight pipe instead of the bent portion, as long as being located in a recess, and the shape and size of the recess space 320, in which the detection unit 302 of the pressure sensor 301 is provided, are not particularly limited.

Additionally, even if the recess space 320 is not provided, the detection unit 302 may be provided outside the outer wall line 333 so as to be invisible when viewed to the upstream side in the intake direction along the axial direction of the throttle valve 20. The pressure sensor 301 may also be configured so that the intake air is measurable but the air flowing backward does not directly impinge on the detection unit of the pressure sensor 301, such as at a position where the detection unit is invisible, as with the pressure sensor 301 in FIG. 13.

LEGEND FOR REFERENCE NUMERALS

1: engine body; 6: intake system; 10: vehicle, 11: engine room; 15a: low-pressure intake passage; 15b: high-pressure intake passage; 17: supercharger; 20: throttle valve; 106:

intercooler (heat exchanger); 107: forth connection member; 107*b* outer bent line; 107*c*: pipe axis; 109 bypass pipe; and 200: air bypass valve.

The invention claimed is:

1. An engine peripheral structure comprising:
an engine body mounted in an engine room;
an intake system connected to the engine body; and
a supercharger provided in the middle of the intake system,
wherein
the intake system includes:
   a low-pressure intake passage connected upstream in an intake direction of the supercharger; and
   a high-pressure intake passage connected downstream in the intake direction of the supercharger, and
the intake system has the low-pressure intake passage and the high-pressure intake passage extended on one side surface of the engine body in a top view of the engine room so as to be at least partly overlapped with each other in a top view of the engine room,
the low-pressure intake passage is provided, at a portion thereof at least partly overlapping in a top view with the high-pressure intake passage, with an air bypass valve, and
the air bypass valve is provided at a portion, facing the engine body, of the low-pressure intake passage.

2. The engine peripheral structure as claimed in claim 1, wherein a heat exchanger is provided on the high-pressure intake passage located on one side surface of the engine body in a top view of the engine room.

3. The engine peripheral structure as claimed in claim 2, wherein an outlet portion of the heat exchanger is disposed so as to at least partly overlap in an up-down direction with a throttle valve provided in the engine body.

4. The engine peripheral structure as claimed in claim 1, wherein the low-pressure intake passage is provided, at a portion thereof overlapping in a top view with the high-pressure intake passage, with the air bypass valve and the high-pressure intake passage is provided, at a portion thereof at least partly overlapping in an up-down direction with the low-pressure intake passage, with a bypass pipe having one end thereof connected to the air bypass valve,
wherein the high-pressure intake passage is connected to an other end of the bypass pipe, said one end of said bypass pipe being communicably connected to the air bypass valve, and
the high-pressure intake passage is routed so as to overlap in a top view with the bypass pipe.

5. The engine peripheral structure as claimed in claim 4, wherein the low-pressure intake passage, at least partly overlapping in a top view with the high-pressure intake passage, is provided with a chamber connected between the bypass pipe and the air bypass valve, wherein a diameter of the chamber is set to be larger than that of the bypass pipe.

6. The engine peripheral structure as claimed in claim 4, wherein a heat exchanger is provided on the high-pressure intake passage located on one side surface of the engine body in a top view of the engine room, and
said other end of the bypass pipe is connected downstream in the intake direction of the heat exchanger, in the high-pressure intake passage.

7. The engine peripheral structure as claimed in claim 1, wherein the low-pressure intake passage and the high-pressure intake passage extend so as to overlap all over with each other in a top view of the engine room.

8. An engine peripheral structure comprising:
an engine body mounted in an engine room;
an intake system connected to the engine body; and
a supercharger provided in the middle of the intake system,
wherein
the intake system includes:
   a low-pressure intake passage connected upstream in an intake direction of the supercharger; and
   a high-pressure intake passage connected downstream in the intake direction of the supercharger,
the intake system has the low-pressure intake passage and the high-pressure intake passage extended on one side surface of the engine body, which is substantially parallel to an axial direction of a cylinder of the engine body, so as to be at least partly overlapped with each other in the axial direction of the cylinder, and
the air bypass valve is provided at a portion, facing the engine body, of the low-pressure intake passage.

* * * * *